(12) United States Patent
Michalewich et al.

(10) Patent No.: US 12,005,318 B1
(45) Date of Patent: Jun. 11, 2024

(54) GOLF BALL COATINGS FORMED FROM HYDROXYURETHANE COMPOSITIONS

(71) Applicant: Acushnet Company, Fairhaven, MA (US)

(72) Inventors: Michael Michalewich, Norton, MA (US); Manjari Kuntimaddi, Raynham, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 18/102,289

(22) Filed: Jan. 27, 2023

(51) Int. Cl.
*A63B 37/12* (2006.01)
*A63B 37/00* (2006.01)
*C09D 175/12* (2006.01)

(52) U.S. Cl.
CPC .... *A63B 37/00221* (2020.08); *A63B 37/0074* (2013.01); *C09D 175/12* (2013.01); *A63B 37/0075* (2013.01); *A63B 37/0076* (2013.01)

(58) Field of Classification Search
CPC .................................................. A63B 37/0022
See application file for complete search history.

(56) References Cited

U.S. PATENT DOCUMENTS

| | | |
|---|---|---|
| 4,798,386 A | 1/1989 | Berard |
| 4,871,589 A | 10/1989 | Kitaoh et al. |
| 5,000,458 A | 3/1991 | Proudfit |
| 5,006,297 A | 4/1991 | Brown et al. |
| 5,300,325 A | 4/1994 | Nealon et al. |
| 5,334,673 A | 8/1994 | Wu |
| 5,409,233 A | 4/1995 | Kennedy |
| 5,461,109 A | 10/1995 | Blair et al. |
| 6,120,905 A | 9/2000 | Figovsky |
| 6,132,324 A | 10/2000 | Hebert et al. |
| 6,315,915 B1 | 11/2001 | Hebert et al. |
| 6,340,503 B1 | 1/2002 | Simonds et al. |
| 6,677,401 B2 | 1/2004 | Boehm et al. |
| 6,992,135 B2 | 1/2006 | Boehm et al. |
| 9,260,564 B2 | 2/2016 | Lombardo et al. |
| 2007/0173348 A1 | 7/2007 | Rajagopalan et al. |
| 2010/0255934 A1 | 10/2010 | Rajagopalan et al. |
| 2014/0274473 A1* | 9/2014 | Yontz ................... C09D 175/06 473/378 |
| 2017/0246511 A1 | 8/2017 | Ricci et al. |

FOREIGN PATENT DOCUMENTS

EP      1 070 733      1/2001

OTHER PUBLICATIONS

Beniah, Goliath, et al., "Non-Isocyanate Polyurethane Thermoplastic Elastomer: Amide-Based Chain Extender Yields Enhanced Nanophase Separation and Properties in Polyhydroxyurethane", Macromolecules, American Chemical Society, May 22, 2017, pp. 4425-4434.

(Continued)

*Primary Examiner* — Raeann Gorden
(74) *Attorney, Agent, or Firm* — Bradley Arant Boult Cummings LLP

(57) ABSTRACT

Coating compositions including hydroxyurethane linkages, coating layers formed from such coating compositions, and golf balls including such coating layers.

20 Claims, 3 Drawing Sheets

(56) References Cited

OTHER PUBLICATIONS

Kathalewar, Mukesh S., et al., "Non-Isocyanate Polyurethanes: From Chemistry to Applications", The Royal Society of Chemistry, 2013, pp. 4110-4129.

Leitsch, Emily K., "Polyurethane/Polyhydroxyurethane Hybrid Polymers and Their Applications as Adhesive Bonding Agents", 2019, pp. 1-24, https://www.sciencedirect.com/science/article/piiS0143749615001372e72112fb0155f334c95dc02d6704046d.

Lambeth, Robert H., et al., Nonisocyanate Polyurethanes From Six-Membered Cyclic Carbonates: Catalysis and Side Reactions, Journal of Applied Polymer Science, 2017, pp. 1-7.

* cited by examiner

GOLF BALL COATINGS FORMED FROM
HYDROXYURETHANE COMPOSITIONS

FIELD OF THE INVENTION

The present disclosure relates generally to coating compositions with hydroxyurethane linkages, methods of making such coating compositions, and golf balls coated with such coating compositions. More specifically, the coating compositions of the present disclosure include hydroxyurethane linkages that are the result of the reaction of cyclic carbonate and at least one carboxyl-reactive component. The coating compositions may also include urethane and/or urea linkages.

BACKGROUND OF THE INVENTION

As a result of the favorable properties, polyurethanes and polyureas are employed as structural and coating layers for golf balls. For example, a golf ball may include a thin, clear coating layer formed from polyurethane or polyurea. Whether used for structural layers or coating layers, polyurethanes and polyureas used in golf ball manufacturing are generally formed by the reaction between an isocyanate-containing component and an isocyanate-reactive component. In particular, polyurethanes are produced by the reaction of a multi-functional isocyanate (NCO—R—NCO) with a long-chain polyol having terminal hydroxyl groups (HO—OH) in the presence of a catalyst and other additives. The chain length of the polyurethane prepolymer may be extended by reacting it with short-chain diols (OH—R'—OH). Similarly, polyureas are produced by the reaction of a multi-functional isocyanate (NCO—R—NCO) with a long-chain polyamine having terminal amino groups in the presence of a catalyst and other additives. The chain length of the polyurea prepolymer may be extended by reacting it with short-chain diamines.

However, the isocyanate-containing component in these conventional polyurethane and polyurea compositions is highly reactive to moisture and may have other processing drawbacks. Indeed, during the formation of the polyurethane or polyurea and during storage, the reaction between isocyanate and water may cause issues. For example, such coating materials will react with the atmospheric moisture or humidity and produce carbon dioxide gas, which may result in down glossing, foaming, and/or pin holing on the coated surface. As a result, until the coatings are applied to the surface, careful isolation of the isocyanate from water is important to avoid an irreversible reaction that forms urea and $CO_2$ (resulting in a hardened, unusable product).

Thus, there is a need in the art for improved coating compositions for use with golf balls. Indeed, it would be advantageous to have coating compositions that avoid the moisture sensitivity or other issues (while still possessing the desirable attributes) typically associated with conventional, isocyanate-based polyurethane and polyurea coating compositions. The present invention provides such coating compositions and golf balls coated with such coating compositions.

SUMMARY OF THE INVENTION

The present invention relates to a golf ball, including: a core; a cover disposed on the core; and a coating disposed on the cover, wherein the coating is formed from a reaction product of a two-part reactive composition including a first part comprising at least one cyclic carbonate and a second part including at least one amine-terminated component, wherein the reaction product includes hydroxyurethane linkages. In some aspects, the amine-terminated component includes a solvent. In other aspects, the cyclic carbonate includes a five-membered cyclic carbonate, a six-membered cyclic carbonate, or a combination thereof. The cyclic carbonate may include a cyclocarbonate functionality of equal to or greater than 2.

In one embodiment, the amine-terminated component includes two primary functional amines at terminal ends of a polyol backbone. The polyol backbone may include a polyether polyol backbone. The amine-terminated component may include three primary amine functional groups.

In some embodiments, the coating composition further includes organic units joined by at least one of the following linkages:

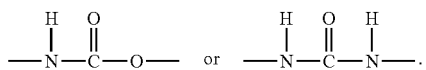

The present disclosure also relates to a golf ball, including a core, a cover disposed on the core, and a coating disposed on the cover, wherein the coating is formed from a two-part reactive composition including hydroxyurethane linkages and urethane linkages, wherein the two-part reactive composition includes a first part including a first reaction product of at least one cyclic carbonate and at least one amine-terminated component and a second part including an isocyanate-containing component, and wherein the ratio of hydroxyurethane linkages to urethane linkages is 50:1 to 2:1.

In some embodiments, the ratio of hydroxyurethane linkages to urethane linkages is 50:1 to 10:1. In other embodiments, the amine-terminated component includes a solvent. In still other embodiments, the cyclic carbonate includes a five-membered cyclic carbonate, a six-membered cyclic carbonate, or a combination thereof. In yet other embodiments, the amine-terminated component includes two primary functional amines at terminal ends of a polyol backbone. The polyol backbone may include a polyether polyol backbone.

In an embodiment, the amine-terminated component includes three primary amine functional groups. In another embodiment, the cyclic carbonate has a cyclocarbonate functionality of equal to or greater than 2. In yet another embodiment, the isocyanate-containing component includes a blocked isocyanate.

The present disclosure also relates to a golf ball, including a core, a cover disposed on the core, and a coating disposed on the cover, wherein the coating is formed from a two-part reactive composition including hydroxyurethane linkages and urea linkages, wherein the two-part reactive composition includes a first part comprising a first reaction product of at least one cyclic carbonate and at least one amine-terminated component and a second part including an isocyanate-containing component, and wherein the ratio of hydroxyurethane linkages to urea linkages is 50:1 to 2:1.

In some embodiments, the ratio of hydroxyurethane linkages to urea linkages is 50:1 to 10:1. In other embodiments, the amine-terminated component includes a solvent. In still other embodiments, the cyclic carbonate includes a five-membered cyclic carbonate, a six-membered cyclic carbonate, or a combination thereof. In yet other embodiments, the amine-terminated component includes two primary functional amines. The two primary functional amines may be at terminal ends of a polyol backbone. The polyol backbone may include a polyether polyol backbone. In still other embodiments, the cyclic carbonate has a cyclocarbonate functionality of equal to or greater than 2. In other embodiments, the isocyanate-containing component includes a blocked isocyanate.

The present disclosure further relates to a golf ball, including a core, a cover disposed on the core, and a coating disposed on the cover, wherein the coating is formed from a two-part reactive composition including hydroxyurethane linkages and urethane and/or urea linkages, wherein the two-part reactive composition includes a first part comprising a first reaction product of at least one cyclic carbonate having cyclocarbonate functionality of equal to or greater than 2, and at least one amine-terminated component and a second part including an isocyanate-containing component, and wherein the ratio of hydroxyurethane linkages to urethane and/or urea linkages is 50:1 to 2:1. In one embodiment, the ratio of hydroxyurethane linkages to urethane and/or urea linkages is 50:1 to 10:1.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

Figure 1:
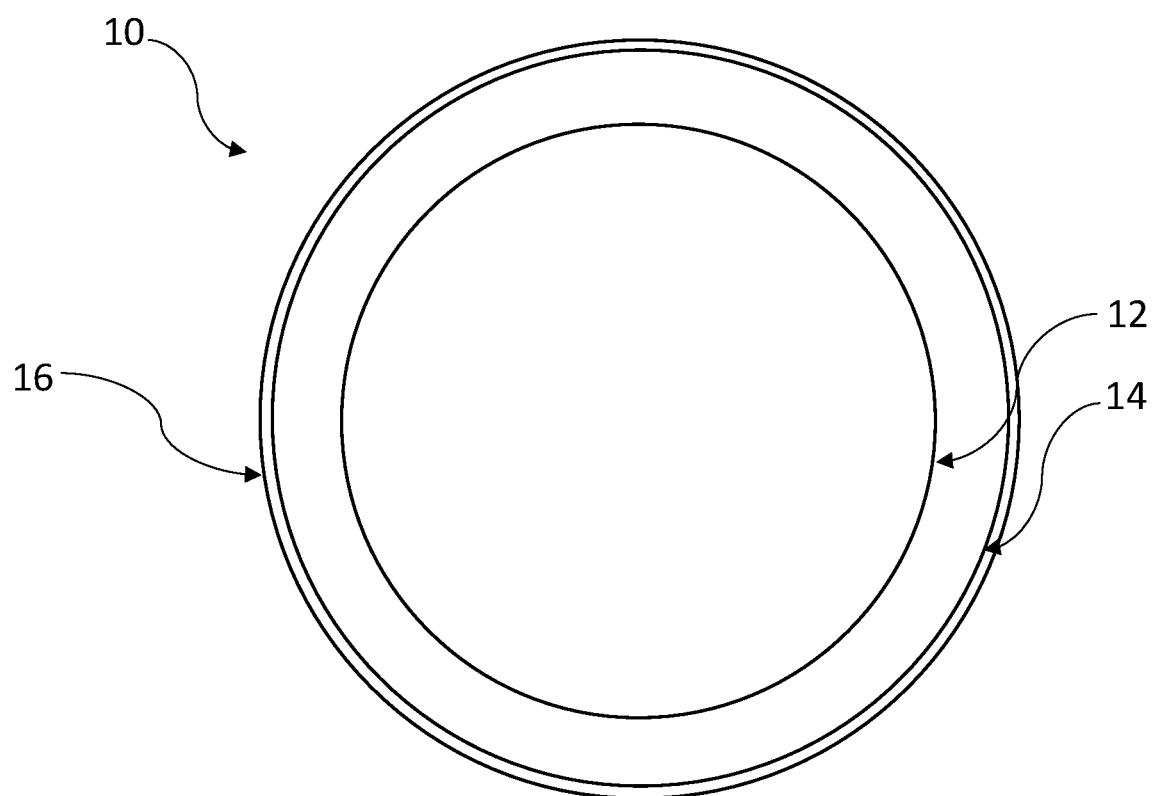
FIG. 1 is a cross-sectional view of a two-piece golf ball with a coating layer in accordance with an embodiment of the present disclosure.

The present disclosure relates to coating compositions with hydroxyurethane linkages for use in golf balls. In particular, the coating compositions of the present disclosure have decreased moisture sensitivity while still providing desirable performance attributes. More specifically, the coating compositions of the present disclosure may be applied as a coating over an outer structural layer of a golf ball. The compositions and the golf balls formed therefrom are discussed in more detail below.

Coating Compositions

The compositions of the present disclosure are formed from at least one carboxyl-reactive component (e.g., an amine-terminated component) and at least one cyclocarbonate and include organic units joined by hydroxyurethane linkages. Hydroxyurethane linkages have a secondary or primary alcohol group adjacent to the traditional urethane linkage. For example, a composition of the present disclosure may include the following linkages:

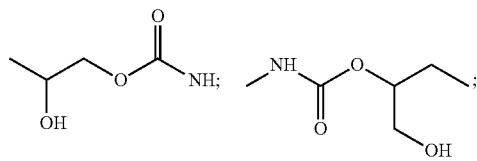

-continued

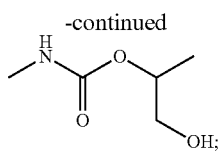

and combinations thereof.

The compositions of the present disclosure are also defined by the soft and hard segments therein. However, unlike the isocyanate-containing hard and soft segments in a conventional polyurethane or polyurea coating, the hard segment in a composition of the present disclosure is formed from a cyclic carbonate and the soft segment is formed from an amine-terminated component. In some embodiments, the hydroxyurethane composition of the present disclosure is the reaction product of an amine-terminated component and a cyclic carbonate.

In some embodiments, the coating compositions are substantially free of isocyanate. As used herein the term "substantially free of isocyanate" means that isocyanate-containing components are present in an amount of less than about 1 percent by weight of the composition. In some embodiments, the compositions of the present disclosure include less than 0.1 percent by weight isocyanate based on the total weight of the composition. In other embodiments, the compositions of the present disclosure are free of isocyanate.

The components of the coating composition discussed in more detail below may be combined to form one-part or two-part systems. One-part systems are generally made up of minute polymeric particles (reacted or partially reacted) that are suspended or dispersed in one or more solvents. In contrast, the primary reactants in two-part systems are kept separate from one another until the actual coating need be applied to the golf ball. Two-part systems in accordance with the present disclosure include the cyclic carbonate in a first part and the carboxyl-reactive component and all other components in the second part. In such two-part formulations, the first and second part are storage-stable as long for as the components themselves are storage-stable. For example, a two-part polyurethane coating system may include separate packages of the carboxyl-reactive component and cyclic carbonate, which are mixed together to yield the coating composition. In this regard, both parts are mixed in the specified ratio prior to application or applied by means of so-called two-part systems.

In still other embodiments, the components of the coating compositions of the present disclosure are multi-part systems. For example, the two-part systems discussed above may be used to form an intermediate reaction product having hydroxyurethane linkages and then an isocyanate and one or more isocyanate-reactive components may be further added to form a composition that includes hydroxyurethane linkages as well as urethane and/or urea linkages.

In some embodiments, the coating composition is solvent-borne composition. In particular, a solvent may be used for coating compositions to achieve a specific viscosity and enable flow for the application of the coating. In some embodiments, the coating compositions according to the disclosure can be prepared in solvents that are inert with respect to the functional groups, such as hydrocarbons, esters, ketones, ethers, ether esters, alkanes or aromatic solvents, such as xylene or toluene. In other embodiments, the solvent includes methyl isobutyl ketone, methyl amyl ketone, methyl isoamyl ketone, butyl acetate such as n-butyl acetate and t-butyl acetate, ethyl acetate, propylene glycol monomethyl ether acetate, xylene, methoxy propyl acetate, N-methylpyrrolidone, solvesso solvent, petroleum hydrocarbons, chlorobenzene, or mixtures thereof. The solvent may be included in any amount in the coating composition, such as up to about 70 percent, less than about 40 percent, less than about 20 percent, less than about 10 percent, or less than about 5 percent, by total weight of the coating composition. In one embodiment, solvents are included in amounts of about 5 to about 70 weight percent based on the total weight of the coating composition. In another embodiment, solvents are included in amounts of about 10 to about 65 weight percent based on the total weight of the coating composition. In yet another embodiment, the solvent is present in the composition in an amount of about 20 percent to about percent by weight of the coating composition. In still another embodiment, the coating composition includes about 10 percent to about 35 percent by weight solvent. Water is generally excluded from the reaction environment in solvent-borne coatings.

In other embodiments, the coating composition is waterborne. Aqueous coatings include aqueous solutions, emulsions, and colloidal dispersions. In the aqueous solution (of resin), the resin used may have a hydrophilic functional group, a curative may be used except when the resin is a particular alkyd resin; and heating and drying at high temperatures may be necessary. In the emulsion and colloidal dispersions, ions, hydrophilic polymers, and low-molecular emulsifiers are adsorbed or absorbed onto a hydrophobic polymer such that the coating has desirable water resistance and durability.

In still other embodiments, the coating composition has a high solids content, i.e., about 40 percent or greater. In one embodiment, the coating composition of the invention has a solids content of about 40 percent to about 40 percent. In another embodiment, the solid content of the polyurea coating composition is about 60 percent to about 100 percent. In still another embodiment, the solids content is about 80 percent to about 100 percent. For example, the coating composition may be 100 percent solids. Low amounts of solvent, e.g., about 10 percent or less (by weight of the coating composition), are particularly useful when the coating composition has a high solids content. In this aspect, the high solids coating composition may include about 5 percent or less solvent. In other embodiments, the high solids coating composition is substantially free of solvent. As used herein, the term "substantially free of solvent" means that about 3 percent or less solvent is included in the coating composition of the invention. In some embodiments, the coating composition includes about 2 percent or less solvent. In still other embodiments, the coating composition includes about 1 percent or less solvent.

Carboxyl-Reactive Component

The carboxyl-reactive component that forms that the soft segment of the polyurethane may include a backbone with at least two primary or secondary amine functional groups. The carboxyl-reactive component may be aliphatic, aromatic, or aliphatic-aromatic. In some embodiments, the carboxyl-reactive component is aliphatic. Without being bound by any particular theory, an aliphatic carboxyl-reactive component may provide better reactivity with certain cyclic carbonates.

In one embodiment, the carboxyl-reactive component is an amine-terminated component having two or more primary amine functional groups located at the ends of the backbone. The backbone may be any suitable backbone chain structure including saturated or unsaturated, and linear, branched, or cyclic. In this regard, suitable amine-terminated components may have molecular weights of 50 to 50,000 and at least two primary or secondary amine terminal groups per molecule. In some embodiments, the molecular weight of the amine-terminated component is about 500 or greater, about 1000 or greater, or about 2000 or greater. In another embodiment, the amine-terminated component molecular weight is about 8000 or less, about 4,000 or less, or about 3,000 or less. For example, in one embodiment, the molecular weight of the amine-terminated component is about 1000 to about 4000.

Examples of amine-terminated components include, but are not limited to, polyether polyamines such as polyoxyalkylene diamines, polyoxyethylene diamines, polyoxypropylene diamines, poly(oxyethylene-oxypropylene) diamines, polyoxypropylene triamine, poly(tetramethylene ether) diamines, (ethylene oxide)-capped polyoxypropylene ether diamines, poly(triethyleneglycol) diamines, poly(trimethylolpropane) triamines, polyethyleneglycol-di(p-aminobenzoate), polytetramethyleneoxide-di(p-aminobenzoate), glycerin-based triamines; and other polyamines such as polyester polyamines, polycaprolactone polyamines, polycarbonate polyamines, polyhydrocarbon polyamines, polyamines converted from acid functional oligomers or polymers or ionomers thereof, polyolefin polyamines, polyamide polyamines, and combinations thereof. In some embodiments, the amine-terminated component is ethylenediamine, hexamethylenediamine, tris(2-aminoethyl)amine, and combinations thereof.

In some aspects, amine-terminated components suitable for use in accordance with the present disclosure are prepared from polyols and/or include a polyol backbone. In this aspect, any polyol available to one of ordinary skill in the art is suitable for use and an amine-terminated component suitable for use in accordance with the present disclosure may be prepared from the polyols discussed herein through reductive amination of polyether polyols with ammonia and hydrogen in the presence of a catalyst, hydrogenation of cyanoethylated polyols, amination of polyol/sulfonic acid esters, reacting polyols with epichlorohydrin and a primary amine, or any other methods known to the skilled artisan. The polyol may be a diol or triol. The polyol may be used solely, or two or more of the polyols may be used in combination. Nonlimiting examples of suitable polyols include polyether polyols, hydroxy-terminated polybutadiene (including partially/fully hydrogenated derivatives), polyester polyols, polycaprolactone polyols, polycarbonate polyols, and acrylic polyols.

In one embodiment, the polyol includes a polyether polyol such as polyoxytetramethylene glycol (PTMEG), polyoxyethylene glycol (PEG), polyethylene propylene glycol, polyoxypropylene glycol (PPG), and mixtures thereof. Such amine-terminated components include, but are not limited to, polytetramethylene ether diamine, modified polytetramethylene ether diamine, poly(tetrahydrofuran-co-methyltetrahydrofuran) ether diamine, poly(oxyethylene) diamine, poly(oxypropylene) ether diamine or triamine, poly(oxyethylene-oxypropylene) diamine, (ethylene oxide)-capped poly(oxypropylene) diamine, poly(ethylene adipate) diamine, poly(butylene adipate) diamine, poly(hexamethylene adipate) diamine, poly(ethylene propylene adipate) diamine, poly(ethylene butylene adipate) diamine, poly(hexamethylene butylene adipate) diamine, (o-phthalate-1,6-hexanediol)-based polyester polyamine, poly(ethylene terephthalate)-based polyester polyamine, (alkylene oxide)-initiated polycaprolactone polyamine, (ethylene glycol)-initiated polycaprolactone polyamine, (diethylene glycol)-initiated polycaprolactone polyamine, (propylene glycol)-initiated polycaprolactone polyamine, (dipropylene glycol)- initiated polycaprolactone polyamine, 1,4-butanediol-initiated polycaprolactone polyamine, trimethylolpropane-initiated polycaprolactone polyamine, (neopentyl glycol)-initiated polycaprolactone polyamine, 1,6-hexanediol-initiated polycaprolactone polyamine, (polytetramethylene ether glycol)-initiated polycaprolactone polyamine, poly(phthalate carbonate) diamine, poly(hexamethylene carbonate) diamine, (bisphenol A)-based polycarbonate diamines, polyisoprene polyamine, poly(hydrogenated isoprene) polyamine, amine-terminated liquid isoprene rubber, polybutadiene polyamine, poly(hydrogenated butadiene) polyamine, poly(ethylene-co-propylene) polyamine, poly(ethylene-co-butylene) polyamine, poly(alkylene-co-styrene) polyamine, glycerine-based polyamines, (castor oil)-based polyamines, dimerate or trimerate polyamines of fatty acids or isostearic acid, or acid functional polyamines. Saturated (aliphatic, alicyclic, or fully hydrogenated) polyamines are suitable for use in golf balls to provide superior light stability, and include polyoxyalkylene diamines, polyoxyethylene diamines, polyoxypropylene diamines, poly(oxyethylene-oxypropylene) diamines, polyoxypropylene triamines, poly(tetramethylene ether) diamines, (ethylene oxide)-capped polyoxypropylene ether diamines, poly(triethyleneglycol) diamines, poly(trimethylolpropane) triamines, saturated glycerin-based triamines, saturated polyester polyamines, saturated polycaprolactone polyamines, saturated polycarbonate polyamines, saturated polyhydrocarbon polyamines, saturated acid functional polyamines, saturated polyolefin polyamines, saturated polyamide polyamines, and combinations thereof.

In one aspect, the backbone includes PEG and the amine-terminated component has the following structure:

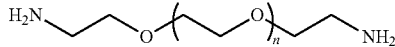

where n represents the degree of polymerization and is a natural number of 1 to 20. In one embodiment, n ranges from 1 to 12. In another embodiment, n ranges from 1 to 8. As would be understood by a person of ordinary skill in the art, n relates to the amount of amine-terminated component used, e.g., when the amine-terminated component is included in an amount of about 20 mol percent, n may be less than when the amine-terminated component is included in an amount of about 5 mol percent.

In another aspect, the backbone includes PTMEG and the amine-terminated component has the following structure:

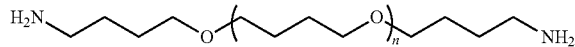

where n represents the degree of polymerization and is a natural number of 1 to 10. In one embodiment, n ranges from 1 to 8. In another embodiment, n ranges from 1 to 5. In still another embodiment, n ranges from 1 to 4. As discussed above, when the amine-terminated component is included in a relatively large amount (e.g., about 20 mol percent), n may be less than when the amine-terminated component is included in a smaller amount (e.g., about 5 mol percent).

In yet another aspect, the amine-terminated component includes repeating oxypropylene units in the backbone and primary amine groups located on secondary carbon atoms at the end of the aliphatic polyether chains:

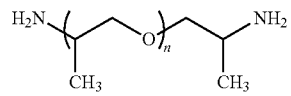

where x may range from 1 to 100. In one embodiment, x ranges from 1 to 70. In another embodiment, x ranges from 1 to 50. In another embodiment, the polyol includes a polyester polyol such as polyethylene adipate (PEA), polybutylene adipate (PBA), and polyhexamethylene adipate (PHMA). In still another embodiment, the polyol includes a polycaprolactone polyol such as poly-ε-caprolactone (PCL). In yet another embodiment, the polyol includes a polycarbonate polyol such as polyhexamethylene carbonate. In still another aspect, the amine-terminated component is amine-terminated polybutadiene-co-acrylonitrile. In yet another aspect, the amine-terminated component is amine-terminated PPG.

Other suitable amine-terminated components include, but are not limited to, m-phenylenediamine, p-phenylenediamine, 1,2- or 1,4-bis(sec-butylamino)-benzene, 3,5-diethyl-(2,4 or 2,6)-toluenediamine, 3,5-dimethylthio-(2,4 or 2,6)-toluenediamine, 3,5-diethylthio-(2,4 or 2,6)-toluenediamine, 4,4'-diamino-diphenylmethane (i.e., 4,4'-methylenedianiline or "MDA"), 3,3'-dimethyl-4,4'-diamino-diphenylmethane, 3,3'-diethyl-5,5'-dimethyl-4,4'-diaminodiphenylmethane (i.e., 4,4'-methylene-bis(2-ethyl-6-methylbenzeneamine)), 3,3'-dichloro-4,4'-diaminodiphenylmethane (i.e., 4,4'-methylene-bis(2-chloroaniline) or "MOCA"), 3,3'-diethyl-5,5'-dichloro-4,4'-diamino-diphenylmethane, 3,3',5,5'-tetraethyl-4,4'-diamino-diphenylmethane (i.e., 4,4'-methylene-bis(2,6-diethylaniline) or "MDEA"), 2,2'-dichloro-3,3',5,5'-tetraethyl-4,4'-diaminodiphenylmethane (i.e., 4,4'-methylene-bis(3-chloro-2,6-diethyleneaniline) or "MCDEA"), 3,3'-dichloro-4,4'-diaminodiphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[4,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, polyoxyethylene diamines, polyoxypropylene diamines, poly(oxyethylene-oxypropylene) diamines, (ethylene oxide)-capped polyoxypropylene ether diamines, polytetramethylene ether diamines, 1-methyl-2,6-diaminocyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, 3,3'-diethyl-5,5'-dimethyl-4,4'-diamino-dicyclohexylmethane, 3,3'-diethyl-5,5'-dichloro-4,4'-diamino-dicyclohexylmethane, 3,3',5,5'-tetraethyl-4,4'-diamino-dicyclohexylmethane (i.e., 4,4'-methylene-bis(2,6-diethylaminocyclohexane)), 2,2'-dichloro-3,3',5,5'-tetraethyl-4,4'-diamino-dicyclohexylmethane, 3,3'-dichloro- 4,4'-diamino-dicyclohexylmethane, 3,3'-dichloro-2,2',6,6'-tetraethyl-4,4'-diamino-dicyclohexylmethane, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), trimethylolpropane-based triamines, glycerin-based triamines, N-(2-aminoethyl)-1,3-propylenediamine (i.e., $N_3$-amine), and tris(2-aminoethyl)amine (all saturated); tetramines such as triethylene tetramine, N,N'-bis(3-aminopropyl)ethylenediamine (i.e., $N_4$-amine) (both saturated); and other polyamines such as tetraethylene pentamine (also saturated).

In some embodiments, the carboxyl-reactive component or amine-terminated component may be mixed with the cyclic carbonate at a suitable weight or molar ratio to form the coating layer, such as, without limitation, 10:1 or less, like 5:1 or 4:1, or 1.1:1 or greater, like 1.5:1, 2:1, or 3:1, or any ranges therebetween. In still other embodiments, the molar ratio of the carboxyl groups in the cyclic carbonate to the amine groups in the amine-terminated component can be 10:1 to 1.1:1, such as 6:1.5 to 2:1 or 5:1 to 3:1.

Cyclic Carbonate

The present disclosure is not limited by the use of a particular cyclic carbonate. In some embodiments, the cyclocarbonate has only cyclocarbonate functionality. In other embodiments, the cyclocarbonate backbone includes epoxy, hydroxyl, and/or other functional groups. Nonlimiting examples of suitable cyclic carbonates for use in forming the compositions of the present disclosure include cyclic carbonate functional oligomers and prepolymers, bis-cyclic carbonate functional oligomers, carbonate soyabean oil and/or linseed oil containing cyclic carbonates, cyclic carbonate functional $SiO_2$ nanoparticles, and combinations thereof.

In some embodiments, the cyclic carbonates are five-membered cyclic carbonates, six-membered cyclic carbonates, seven-membered cyclic carbonates, or combinations thereof. Without being bound by any particular theory, five-membered cyclic carbonates are less reactive than six-membered cyclic carbonates. In this aspect, six- and seven-membered cyclic carbonates are expected to provide higher polymerization rates than five-membered cyclic carbonates. As such, the amount of the various homologues of the cyclic carbonate may vary depending on the reactivity.

In one embodiment, the cyclic carbonate is a five-membered cyclic carbonate compound synthesized through the reaction of alkali metal hydrogen carbonates with oxiranes. In another embodiment, the cyclic carbonate is a five-membered cyclic carbonate compound synthesized through transesterification of 1,2-glycols with ethylene carbonate. In another embodiment, the cyclic carbonate is synthesized from dimethyl carbonate. In still another embodiment, the cyclic carbonate is a five-membered cyclic carbonate compound synthesized through the reaction of oxiranes with butyrolactone. In yet another embodiment, the cyclic carbonate is a five-membered cyclic carbonate compound synthesized by the direct reaction of an epoxy with carbon dioxide.

In some embodiments, the cyclic carbonate may be trimethylol propane tris(glycerol carbonate) ether, triglycidyl isocyanurate carbonate, and the like. In still other embodiments, the cyclic carbonate is a five-membered cyclic carbonate functional oligomer. In this aspect, the cyclic carbonate may be a multifunctional alkylene carbonate. In one aspect, the cyclic carbonate is a bi-functional cyclic carbonate oligomer such as five-membered dicyclic carbonate bis[(2-oxo-1,3-dioxolan-4-yl)methyl] benzene-1,4-dicarboxylate, 1,2-bis[4-(1,3-dioxan-2-one-4-yl)-butylthio]ethane, and combinations thereof.

In another aspect, the cyclic carbonate is a thioether with bis-cyclic carbonate prepared by a one-step reaction by thiol-ene coupling of dithiol and glycerol carbonate derivatives. For example, the cyclic carbonate may be a bis-cyclic carbonate prepared from 4-(3-butenyl)-1,3-dioxolan-2-one, 4-ethenyl-1,3-dioxolan-2-one, 4-[(prop-2-en-1-yl oxy) methyl]-1,3-dioxolan-2-one, or a combination thereof.

In one embodiment, the cyclic carbonate is limonene dicarbonate. In another embodiment, the cyclic carbonate includes cyclic carbonate functional $SiO_2$ nanoparticles. Without being bound by any particular theory, the $SiO_2$ nanoparticles may improve adhesion and reduce water absorption.

In other aspects, the cyclic carbonate may be a six-membered cyclic carbonate functional monomer, a six-membered cyclic carbonate functional oligomer, a six-membered bis-cyclic carbonate functional oligomers, or combinations thereof. In some embodiments, the six-membered cyclic carbonate may be trimethylene carbonate, 5-(2-propenyl)-1,3-dioxan-2-one, 1,2-bis[3-(1,3-dioxan-2-one-5-yl)-propylthio]ethane, divinyl benzene dicyclocarbonate, or a combination thereof. In some embodiments, the cyclic carbonate may be one of the six-membered cyclic carbonate prepared from trimethylol propane as those derivatives shown below:

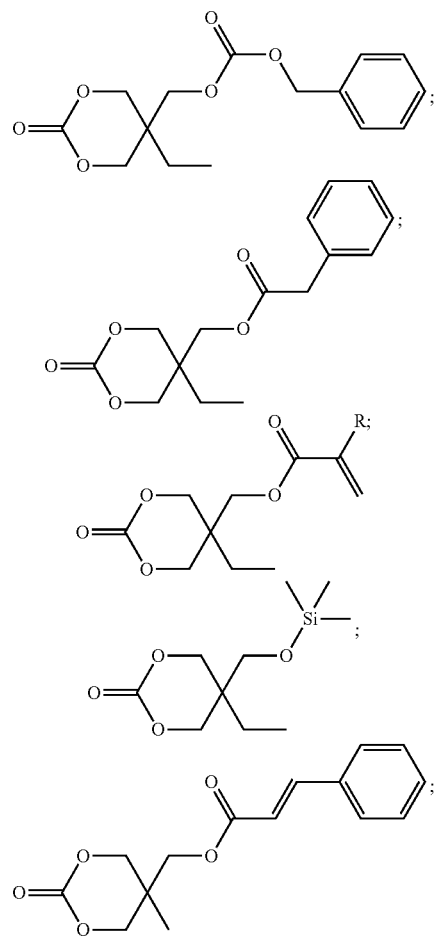

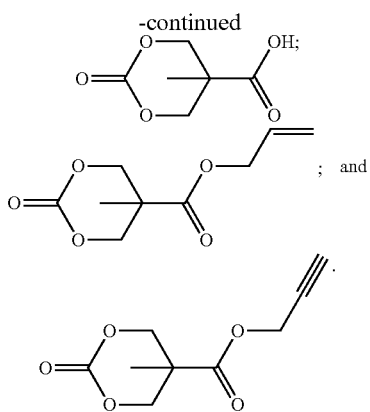

In still other aspects, the cyclic carbonate may include both five- and six-membered moieties. For example, the cyclic carbonate may be a bis(functional) compound such as the following:

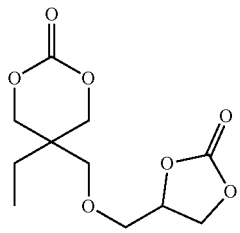 [SMILES: CCC1(COCC2COC(=O)O2)COC(=O)OC1]

(5-ethyl-5-(((2-oxo-1,3-dioxolan-4-yl)methoxy) methyl)-1,3-dioxan-2-one).

Without being bound by any particular theory, the additional hydroxyl groups in the coating compositions of the present disclosure (which are not present in conventional polyurethane coatings having only urethane linkages) are capable of forming intermolecular bonds with the urethane group as shown below:

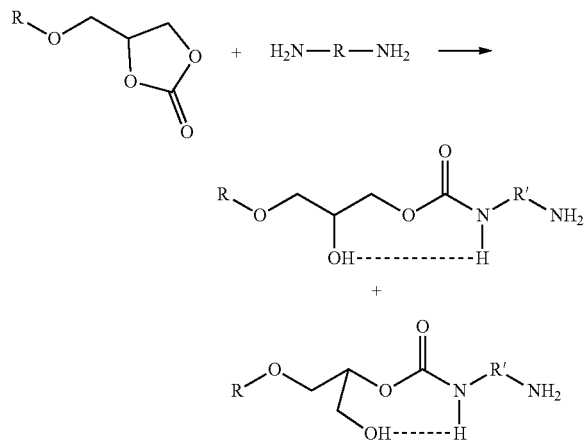

where R is a long chain oligomeric unit and $R_1$ represents any backbone that satisfies the amine-terminated component examples provided above including, but not limited to, straight chain or branched hydrocarbon chains including about 1 to about 20 carbons or mixtures of long chain oligomers and smaller amine functional molecules. Indeed, as shown above, the reaction between the cyclic carbonate and amine-terminated component may result in two isomers were each has a different hydroxyl group. For example, one of the isomers may have a secondary-β-hydroxyl group and the other isomer may have a methylol group. In any event, each of these hydroxyl groups may form intramolecular hydrogen bonds with the urethane group. Without being bound by any particular theory, the intramolecular hydrogen bonds are believed to result in increased hydrolytic stability and higher chemical resistance. Moreover, the lack of biuret and allophanate linkages in the compositions of the present disclosure may result in better thermal stability than conventional (isocyanate-based) polyurethane coating compositions.

In addition, because there is no side reaction with water to cause gas formation, the compositions of the present disclosure lack porosity. In this regard, even if the underlying substrate has imperfections, when applied, the coating compositions of the present disclosure produce a coating layer that is substantially free of pinholes or flaws, i.e., less than about 5 percent imperfections. In some embodiments, the coating layer includes less than about 4 percent imperfections. In other embodiments, the coating layer includes less than about 3 percent imperfections. In still other embodiments, the coating layer includes less than about 2 percent imperfections.

Additives

The compositions of the present disclosure may also include fillers, additives, and other ingredients that do not detract from (and possibly enhance) the properties of the final coating composition. These additional materials include, but are not limited to, coloring agents, optical brighteners, hindered amine light stabilizers, rheology modifiers, catalysts, fluorosurfactants, non-fluorescent and fluorescent whitening agents such as titanium dioxide and zinc oxide, ultraviolet (UV) light absorbers, and other conventional additives. In some embodiments, the coating compositions of the present disclosure include inorganic pigments/fillers such as titanium dioxide, silica, inorganic clay, calcium carbonate, aluminum oxide, and the like. In other embodiments, the compositions of the present disclosure include effect pigments like mica, color shift pigments, dyes, and matting agents. All of these materials, which are well known in the art, are added for their usual purpose in typical amounts. For example, the additives are present in the composition in an amount between about 1 and about 70 weight percent based on total weight of the coating composition depending upon the desired properties. In one embodiment, the additive(s) may be present in an amount of about 15 percent or less by weight of the coating compositions. In another embodiment, one or more additives are present in an amount of about 5 percent or less by weight of the coating composition.

In some embodiments, the coating compositions of the present disclosure include optical brighteners such as triazine-stilbenes (di, tetra-, or hexa-sulfonated); coumarins; imidazolines; diazoles; triazoles; benzoxazolinones; and biphenyl-stilbenes; and mixtures thereof. When used, the optical brighteners may be present in a range of about 0.1 to about 5 weight percent based on the total weight of solids in the coating composition. For example, the coating composition may include about 0.5 to about 3.5 weight percent (based on the total weight of solids) of optical brightener.

Suitable UV absorbers include, but are not limited to, triazines, benzoxazinones, benzotriazoles, benzophenones, benzoates, and the like. When included, light stabilizers may be present in the coating composition in an amount of about 0.1 to about 5 weight percent, about 0.1 to 3 weight percent based on the weight of the coating composition.

Because the reaction of cyclic carbonates with amines is usually slower than the typical reaction of rapid reaction of isocyanates with alcohols (at ambient conditions), a catalyst may be employed to promote the reaction between the cyclic carbonate and amine compounds. In some embodiments, suitable catalysts include, but are not limited to, bismuth catalyst; zinc octoate; stannous octoate; tin catalysts such as di-butyltin dilaurate, bis-butyltin dilaurate, bis-butyltin diacetate, stannous octoate; tin (II) chloride, tin (IV) chloride, bis-butyltin dimethoxide, dimethyl-bis[1-oxonedecyl)oxy] stannane, di-n-octyltin bis-isooctyl mercaptoacetate; amine catalysts such as triethylenediamine, triethylamine, and tributylamine; organic acids such as oleic acid and acetic acid; delayed catalysts; and combinations thereof. In particular, such catalysts are suitable for use to promote the reaction between an isocyanate-containing component, e.g., a blocked isocyanate (once unblocked), and an isocyanate-reactive component, e.g., an amine-terminated component or a hydroxy-terminated component.

In other embodiments, suitable catalysts include tertiary amines such as 1,8-diazobicyclo[5.4.0]undec-7-ene (DBU), 1,5,7-triazabicyclo[4.4.0]dec-5-ene (TBD), and 1-[3,5-bis (trifluoromethyl)phenyl]-3-cyclohexylthiourea (TU); lewis acids and bases and combinations thereof such as those disclosed in U.S. Pat. No. 9,260,564, the entire disclosure of which is incorporated by reference herein; phenols; and mixtures thereof. In this regard, such catalysts are particularly useful to promote the reaction between the cyclic carbonate and amine-terminated component. In some embodiments, the catalyst is one of the following phenols:

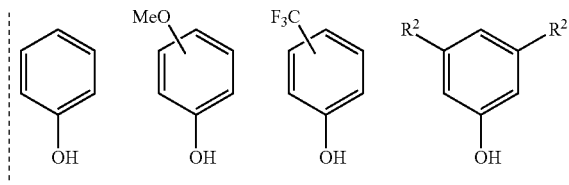

The catalyst is preferably added in an amount sufficient to catalyze the reaction of the components in the reactive mixture. In one embodiment, the catalyst is present in an amount from about 0.001 percent to about 5 percent, 0.01 to 3 percent, or 0.1 to 0.5 percent, by weight of the composition.

In one embodiment, the coating composition includes brightening (metallic) pigments such as aluminum flakes, vapor-deposited aluminum flakes, metal oxide-coated aluminum flakes, or colored aluminum flakes, or pearl brightening material, such as flake or synthetic mica covered with a metal oxide such as titanium oxide, or iron oxide. In this aspect, the brightening (metallic) pigments may be present in the coating in an amount of about 1 weight percent to about 30 weight percent based on total weight of the solids in the coating composition.

In some embodiments, the amine-terminated component may include additives such as catalysts (such as tin catalyst), UV absorbers, hindered amine light stabilizers, optical brighteners, and inorganic pigments (such as titanium dioxide, silica, clay, calcium carbonate).

Properties of the Coating Composition

In some aspects, the coating compositions of the present disclosure are semi-transparent As used herein, a "semi-transparent" coating layer preferably has an average transmittance of visible light (e.g., between about 380 nm and about 770 nm or alternately between about 400 nm and about 700 nm) of less than about 80% and preferably about 75% or less, and the underlying layer is not completely hidden. In other aspects, the coating compositions of the present disclosure are transparent. As used herein, a "transparent" coating layer preferably has an average transmittance of visible light (e.g., between about 380 nm and about 770 nm or alternately between about 400 nm and about 700 nm) of at least about 80% or greater and preferably about 90% or greater. The average transmittance referred to herein is typically measured for incident light normal (i.e., at approximately 90°.) to the plane of the object and can be measured using any known light transmission apparatus and method, e.g., a UV-Vis spectrophotometer.

When applied to a golf ball, the coating composition of the present disclosure has a substantial level of gloss so that the resulting golf ball has an aesthetically pleasing appearance. As would be understood by those of ordinary skill in the art, the gloss of any surface is dependent on the underlying material composition, the surface smoothness, and its ability to reflect light, particularly visible light. Because gloss is a measure of specular reflection, i.e., the higher the percentage of reflection, the glossier the surface, the level of gloss is typically measured with a gloss meter, which projects an illumination beam at an angle onto a sample surface, and measures the percentage of reflected light over a small range of the reflection angle that is registered by a detector. The illumination is preferably near infrared, which is almost impervious to ambient light or the effect of different colors. The illumination angle is critical, particularly for non-metals (coatings, plastics), because it is positively correlated to the amount of specular reflection. The difference between illumination and reflection is absorbed or diffusely scattered dependent on the material and its color. The result of reported by the gloss meter, in Gloss Units of 0 (completely transparent) to 100 (completely reflective) is normalized not against the amount of the incident light, but against the amount of reflected light from a black glass standard with a defined refractive index, which is calibrated to 100 Gloss Units. Measuring standards for gloss include ASTM D523-89 and ASTM D2457-97.

The coating layer of the present invention preferably has a 60° gloss of at least about 3, more preferably at least about 50, and most preferably about 85 or higher. In one embodiment, the coating has a 60° gloss of about 90 or greater. In still another embodiment, the coating has a 60° gloss of about 95 or greater. In yet another embodiment, the coating layer has a 20° gloss of preferably at least about 5, more preferably at least about 30, and most preferably about 70 to about 95. In one embodiment, the coating layer has a 20° gloss of about 85 to about 95.

Hybrid Compositions

The coating compositions of the present disclosure may also be a hybrid hydroxyurethane-urethane or hybrid hydroxyurethane-urea. In this regard, the hybrid hydroxyurethane-urethane may include both hydroxyurethane and urethane linkages. For example, in addition to the hydroxyurethane linkages, the coating composition may include the following urethane linkage(s):

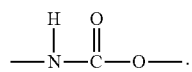

In this aspect, a "conventional" coating formed with an isocyanate-containing component and an isocyanate-reactive component and containing urethane linkages may be mixed with a coating composition of the present disclosure.

In another aspect, the compositions of the present disclosure may also be a hybrid hydroxyurethane-urea. In this regard, the hybrid hydroxyurethane-urea may include both hydroxyurethane and urea linkages. For example, in addition to the hydroxyurethane linkages, the coating composition may include the following urea linkage(s):

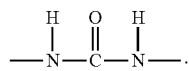

In this aspect, a "conventional" coating formed with an isocyanate-containing component and an isocyanate-reactive component and containing urea linkages may be mixed with a coating composition of the present disclosure.

In other embodiments, a blocked isocyanate is employed to form a hybrid hydroxyurethane-urethane or hydroxyurethane-urea composition. In this aspect, the cyclic carbonate and amine-terminated component are allowed to partially or fully react before the isocyanate groups in the blocked isocyanate are exposed for crosslinking (either by increasing the temperature to at least 190° F. or more or through an exothermic reaction). Once the blocked isocyanate is unblocked, any of the amine-terminated or hydroxy-terminated chain extenders discussed above may be added to produce the urea or urethane linkages.

Suitable blocked isocyanates include, but are not limited to, an isocyanate-containing component that contains at least one isocyanate group blocked with a blocking agent. In some embodiments, the blocked isocyanate includes a first isocyanate group blocked with a first blocking agent and a second isocyanate group blocked with a second blocking agent. In some embodiments, the first and second blocking agents are the same. In other embodiments, the first and second blocking agents are different.

In this aspect, greater than about 80 percent of the isocyanate radicals may be blocked. In one embodiment, about 90 percent or greater of the isocyanate radicals are blocked. In another embodiment, about 95 percent or more of the isocyanate radicals are blocked. In another embodiment, about 97 percent or more of the isocyanate radicals are blocked. In still another embodiment, substantially all of the isocyanate radicals are blocked.

The blocking agent may be any suitable blocking agent that results in the prevention of premature polymerization or crosslinking of the isocyanate groups. Suitable blocking agents include, but are not limited to, linear and branched alcohols; phenols and derivatives thereof, such as xylenol; oximes, such as methyl ethyl ketoxime; lactams, such as ε-caprolactam; lactones, such as caprolactone; dicarbonyl compounds; hydroxamic acid esters; bisulfite addition compounds; hydroxylamines; esters of phydroxybenzoic acid; N-hydroxyphthalimide; N-hydroxysuccinimide; triazoles; substituted imidazolines; tetrahydropyrimidines; caprolactones; and mixtures thereof. In one embodiment, the blocking agent is selected from the group consisting of phenols, branched alcohols, methyl ethyl ketoxime, ε-caprolactam, ε-caprolactone, and mixtures thereof.

In some aspects, the blocking agent may be represented by general formula (1) below:

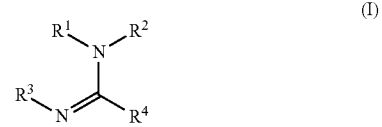

where $R^1$ to $R^3$ represent a hydrocarbon group having 1 to 12 carbon atoms or a hydrogen atom and at least one of $R^1$ to $R^3$ represents a hydrogen atom, and R1 and R3 may be bonded to each other to form a heterocycle. $R^4$ may represents a hydrocarbon group having 1 to 12 carbon atoms, a hydrogen atom, or an atomic group represented by $—NR_5R_6$ ($R_5$ and $R_6$ each represent a hydrocarbon group having 1 to 12 carbon atoms, and $R_5$ and $R^1$ may be bonded to each other to form a heterocycle, and $R_6$ and $R^3$ may be bonded to each other to form a heterocycle).

In other embodiments, the blocking agent may have a dissociation temperature of 130° C. or less. For example, the dissociation temperature of the blocking agent may be 50° C. to about 120° C.

The present disclosure is not limited by the use of particular isocyanate-containing components in the CPP or blocked isocyanate. Suitable isocyanates may be aromatic or aliphatic in nature. Nonlimiting examples of polyisocyanates for use in the CPP or blocked isocyanate include 4,4'-diphenylmethane diisocyanate ("MDI"), polymeric MDI, carbodiimide-modified liquid MDI, 4,4'-dicyclohexylmethane diisocyanate ("HINDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); p-methylxylene diisocyanate; m-methylxylene diisocyanate; o-methylxylene diisocyanate; para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. In one embodiment, the polyisocyanate is selected from MDI, PPDI, TDI, and combinations thereof. In another embodiment, the polyisocyanate includes MDI. It should be understood that, as used herein, the term "MDI" includes 4,4'-diphenylmethane diisocyanate, polymeric MDI, carbodiimide-modified liquid MDI, $H_{12}$MDI, and combinations thereof.

In some aspects, the blocked isocyanates suitable for use in accordance with the present disclosure include isophorone diisocyanate (IPDI)-based uretdione-type crosslinkers; a combination of a uretdione adduct of IPDI and a partially ε-caprolactam-modified IPDI; a combination of isocyanate adducts modified by ε-caprolactam and a carboxylic acid functional group; a caprolactam-modified Desmodur diisocyanate; a Desmodur diisocyanate having a 3,5-dimethyl pyrazole modified isocyanate; and combinations thereof.

The present disclosure is not limited by the use of particular isocyanate-reactive components in the CPP. Suitable isocyanate-reactive components for use in the conventional coating compositions includes polyols and polyamines. In this aspect, suitable polyols include, but are not limited to, polyether polyols, hydroxy-terminated polybutadienes, polyester polyols, polycaprolactone polyols, polycarbonate polyols, and combinations thereof. In this aspect, the polyol may include any one of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl) ether; hydroquinone-di-(β-hydroxyethyl) ether; trimethylol propane; and combinations thereof. Suitable polyamines include any aliphatic or aromatic compound containing two or more primary or secondary amine functional groups. In this aspect, the polyamine compound may have any suitable backbone chain structure including saturated or unsaturated, and linear, branched, or cyclic.

In one embodiment, the ratio of hydroxyurethane:urethane linkages is about 50:1 to about 2:1. In another embodiment, the ratio of hydroxyurethane:urethane linkages is about 50:1 to about 10:1. Similarly, the ratio of hydroxyurethane:urea linkages is about 50:1 to about 2:1. In another embodiment, the ratio of hydroxyurethane:urea linkages is about 50:1 to about 10:1.

Golf Balls

Golf balls formed in accordance with the present disclosure include at least a core and a cover with a coating disposed thereon. Without being bound to any particular theory, the polyurethane coating compositions of the present disclosure are as durable and resilient as conventional polyurethane coating compositions without any sacrifices of performance or processability. In some embodiments, golf balls formed in accordance with the present disclosure have at least one coating layer formed from the coating compositions of the present disclosure. In this aspect, the coating may be transparent, translucent, colored, or pigmented. In another aspect, the coating may be applied as a primer, a base coat, a top coat, or a combination thereof.

The amount of the coating composition applied to a standard-sized golf ball (1.680 inch diameter is about 0.01 grams to about 1 gram. The thickness of the coating may vary depending on the desired degree of protection. In some embodiments, the coating layer may have a thickness of about 0.1 μm to about 50 μm. For example, the coating may have a thickness of about 1 μm to 45 μm or about 2 μm to 40 μm or about 4 μm to 30 μm. In one embodiment, the coating has a thickness of about 10 μm to about 20 μm. Alternatively, the thickness of the coating may about 0.2 mm or less. For example, the coating may be about 0.05 mm to about 0.15 mm thick.

Figure 2:
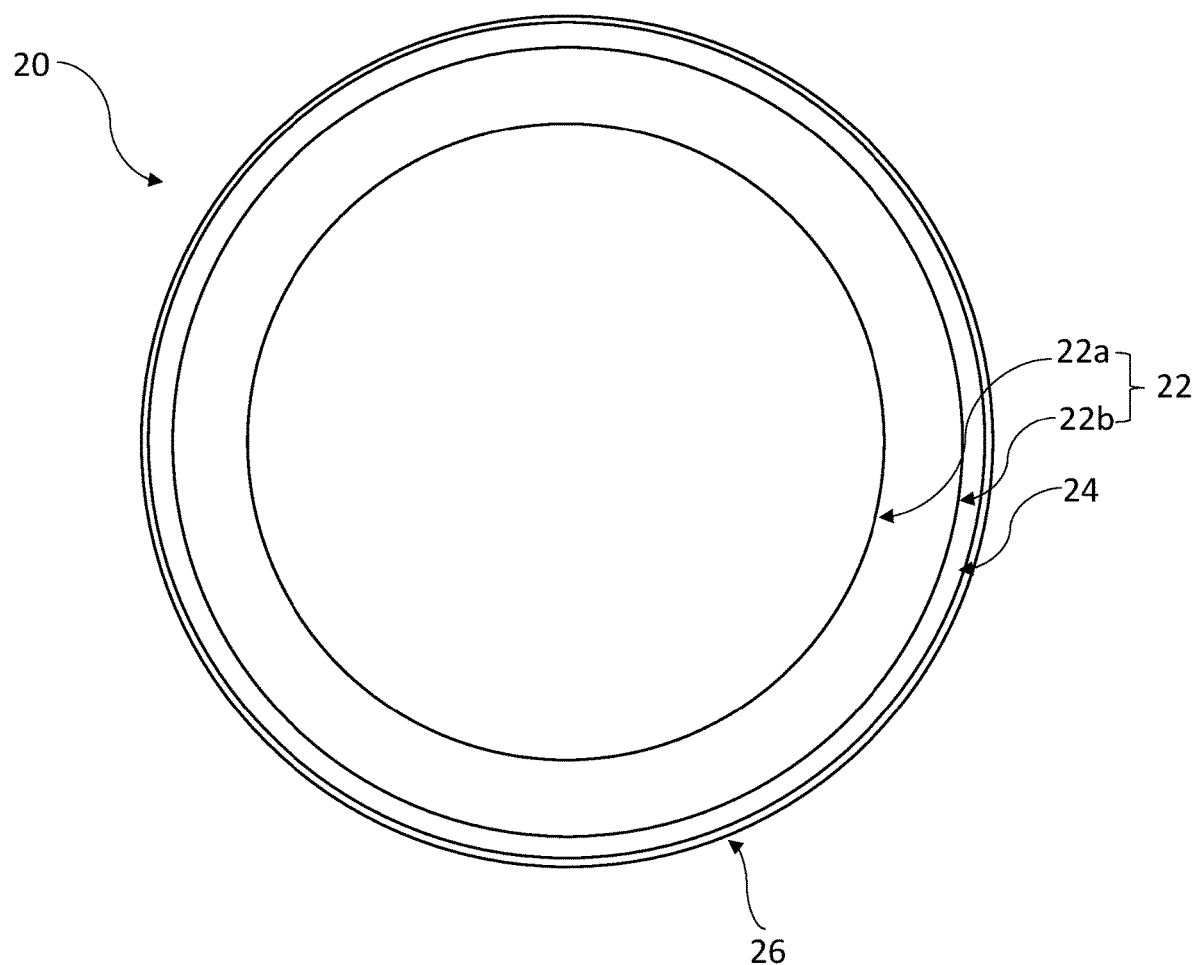
FIG. 2 is a cross-sectional view of a three-piece golf ball with a coating layer in accordance with an embodiment of the present disclosure.
Figure 3:
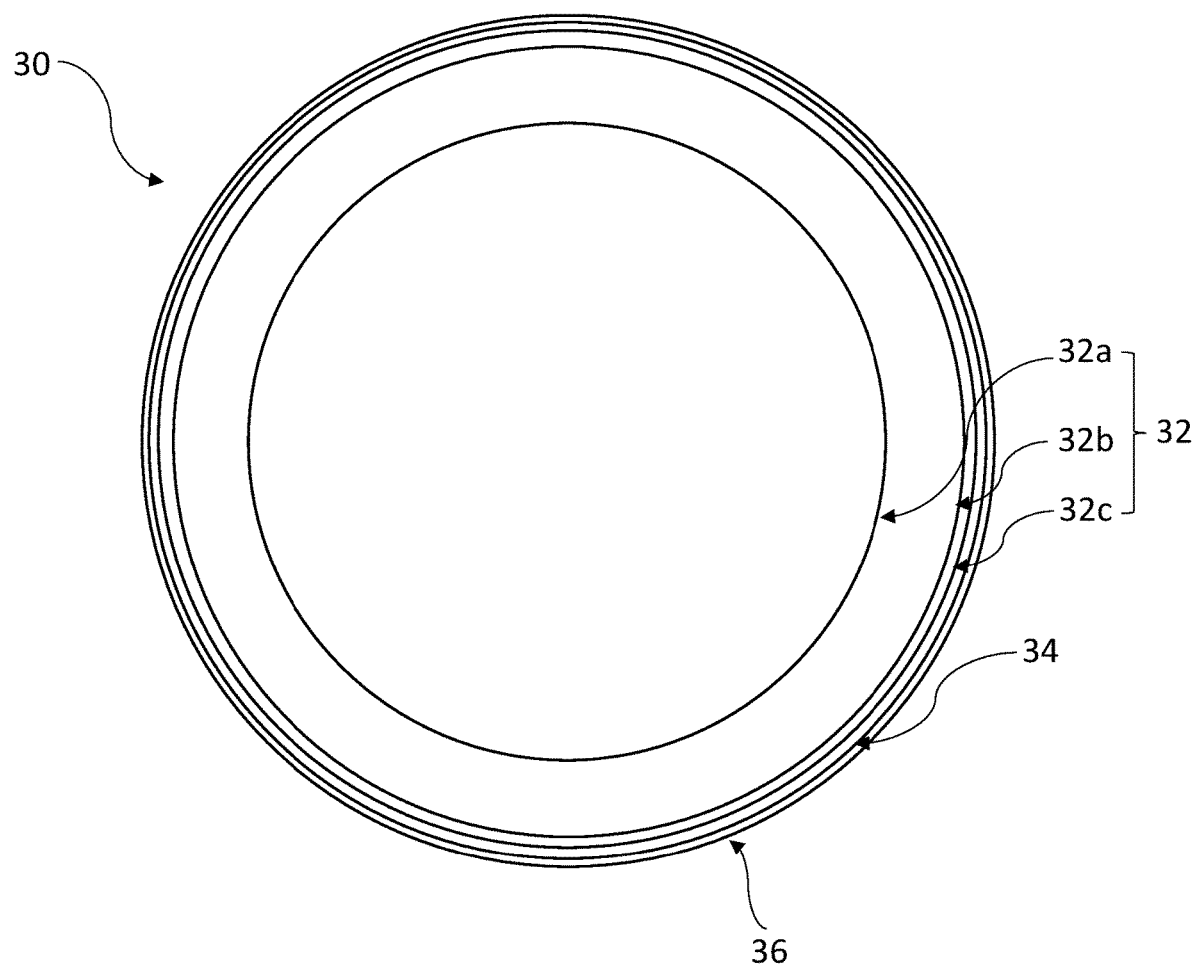
FIG. 3 is a cross-sectional view of a four-piece golf ball with a coating layer in accordance with an embodiment of the present disclosure.

Referring to FIG. 1, in one version, a two-piece golf ball 10 can be made in accordance with the present disclosure. The ball 10 contains a core 12, a cover 14, and a coating layer 16. Referring to FIG. 2, in one version, a three-piece golf ball 20 can be made in accordance with this invention. The ball 20 contains a core 22 including a center 22a and an outer core layer 22b, a cover 24, and a coating layer 26. Referring to FIG. 3, in another version, a four-piece golf ball 30 contains a core 32 including a center 32a, an outer core layer 32c, and an inner core layer 32b disposed between the center 32a and the outer core layer 32c, a cover 34, and a coating layer 36. It is important to note that the dimensions of the coating layer in the drawings are exaggerated to show the presence of the coating layer, however, as known to those of ordinary skill in the art, the coating layer is much thinner than any of the structural layers of the golf ball.

Moreover, in these embodiments, layers 22b and 32c may be considered an intermediate layer, casing or mantle layer, or inner cover layer, or any other layer disposed between the core assemblage and the outer cover of the ball. And, in any of these embodiments, additional structural and/or coating layers may be included.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In one embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may include a solid sphere or a center and at least one core layer disposed thereon. Core components may be formed from a rubber formulation. In one embodiment, the rubber formulation includes a base rubber in an amount of about 5 percent to 100 percent by weight based on total weight of formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inch to about 1.64 inch. In one embodiment, the core has a diameter of about 1.52 inch to about 1.62 inch. In another embodiment, the core diameter ranges from about 1.54 inch to about 1.58 inch.

The cover of a golf ball formed in accordance with the present disclosure may be formed from a variety of materials may be used for forming the cover including, for example, conventional polyurethanes and polyureas; copolymers, blends and hybrids of conventional polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; crosslinked trans-polyisoprene and blends thereof; polyester-based thermoplastic elastomers; polyurethane-based thermoplastic elastomers; synthetic or natural vulcanized rubber; and combinations thereof.

The layer disposed between the core and the cover (if included) may be formed of any conventional or non-conventional material used for forming such layer(s) of the ball including, for instance, ionomer resins, highly neutralized polymers, polybutadiene, butyl rubber, and other rubber-based core formulations, and the like. In this aspect, ionomers suitable for use in accordance with the present disclosure may include partially neutralized ionomers and highly neutralized ionomers (HNPs), including ionomers formed from blends of two or more partially neutralized ionomers, blends of two or more highly neutralized ionomers, and blends of one or more partially neutralized ionomers with one or more highly neutralized ionomers. For purposes of the present disclosure, "HNP" refers to an acid copolymer after at least 70 percent of all acid groups present in the composition are neutralized.

Suitable ionomers may be salts of O/X- and O/X/Y-type acid copolymers, wherein O is an α-olefin, X is a $C_3$-$C_8$ α, β-ethylenically unsaturated carboxylic acid, and Y is a softening monomer. O is preferably selected from ethylene and propylene. X may be selected from methacrylic acid, acrylic acid, ethacrylic acid, crotonic acid, and itaconic acid, Y may be selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Nonlimiting examples of O/X and O/X/Y-type copolymers include ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethyl ene/(m eth)acrylic acid/n-butyl (meth) acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like.

"Low acid" and "high acid" ionomeric polymers, as well as blends of such ionomers, may be used. In general, low acid ionomers are considered to be those containing 16 weight percent or less of acid moieties, whereas high acid ionomers (e.g., Surlyn® 8150) are considered to be those containing greater than 16 weight percent of acid moieties. In one embodiment, the inner cover layer is formed from a composition comprising a high acid ionomer. In another embodiment, the inner cover layer is formed from a composition comprising a high acid ionomer and a maleic anhydride-grafted non-ionomeric (e.g., Fusabond® 525D (DuPont)). Blends of high acid ionomers with maleic anhydride-grafted polymers are further disclosed, for example, in U.S. Pat. Nos. 6,992,135 and 6,677,401, the entire disclosures of which are hereby incorporated herein by reference.

Any of the structural layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents such as pigments and dyes, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a layer disposed on the core formed from an ionomeric material, and a cover formed from a polyurethane composition of the present disclosure, and the cover has a hardness that is less than that of the layer disposed between the core and the cover. For example, the layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the layer disposed between the core and the cover is formed of a polyurethane composition of the present disclosure and the cover is formed of an ionomeric material. In this alternative embodiment, the layer disposed between the core and the cover may have a hardness of less than about 60 Shore D and the cover may have a hardness of greater than about 55 Shore D and the layer disposed between the core and the cover has a hardness that is less than the cover hardness.

When a dual cover is disposed about the core, the layer disposed between the core and the cover may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials.

The coating compositions may be applied in many different ways. Non-limiting examples of application techniques include dipping, spraying, skip-spraying, painting, e.g., rolling or brushing, electrostatic coating, and other coating methods conventionally used in the art (such as those methods described in for example U.S. Pat. Nos. 6,340,503, 5,461,109, 5,409,233, 5,000,458, 4,871,589, 4,798,386 and 5,300,325, the entire disclosures of which are incorporated herein by express reference). In one embodiment, the coating composition is sprayed onto the cover of a golf ball. The coating composition of the present disclosure may be thermal-curable, radiation-curable, or a combination thereof. In some cases, more than one curing mechanism may be used to cure the coating, e.g., evaporation of solvent via ambient air in addition to the subjecting the coating to ultraviolet light.

The cure time/gel time depends on the purity of the composition, the thickness of the coating, and/or the temperature, as well as the type and amount of any catalyst employed. In one embodiment, the cure time is about 5 minutes or greater, preferably about 5 minutes to about 60 minutes. For example, the cure time may be about 5 minutes to about 15 minutes. In still another embodiment, the cure time is about 15 minutes to about 30 minutes. In yet another embodiment, the cure time is about 30 minutes to about 60 minutes. In still another embodiment, the cure time is less than about 5 minutes. For example, the cure time may be about 2 minutes to about 3 minutes. However, the reaction time of the coating is preferably slow enough to ensure that the coating has sufficient time to flow out and form a glass-smooth surface, as well as adhere to the edges and concaves of dimples on the outer surface of the golf ball.

Due to the slower reaction rates of cyclic carbonates (as compared to those of hydroxyl or amino and isocyanate reactions), an elevated cure temperature (e.g., greater than room temperature) is preferred. In this regard, the cure temperature may range from about 100° F. to about 180° F. In one embodiment, the temperature is from about 110° F. to about 175° F. In another embodiment, the temperature is about 130° F. to about 160° F. In still another embodiment, the temperature is about 140° F. to about 170° F.

Golf balls made in accordance with the present disclosure may be subjected to finishing steps such as flash-trimming, surface-treatment, marking, additional coating, and the like using techniques known in the art. In some embodiments, prior to forming the cover layer, the ball subassembly may be surface-treated to increase the adhesion between its outer surface and cover material. In addition, the cover layer may be surface treated to further increase the adhesion between the outer surface of the cover and the coating layer(s).

Examples of such surface-treatment may include mechanically or chemically abrading the outer surface of the subassembly and/or cover. In addition, the subassembly may be subjected to corona discharge, plasma treatment, silane dipping, or other chemical treatment methods known to those of ordinary skill in the art prior to forming the cover around it. Other layers of the ball, for example, the core and cover layers, also may be surface-treated. Examples of these and other surface-treatment techniques can be found in U.S. Pat. No. 6,315,915, the disclosure of which is hereby incorporated by reference.

Indicia such as trademarks, symbols, logos, letters, and the like may be printed on the cover using pad-printing, ink-jet printing, dye-sublimation, or other suitable printing methods. Golf balls may also be painted with one or more paint coatings in a variety of colors. In one embodiment, white primer paint is applied first to the surface of the ball and then the coating composition of the present disclosure is applied over the primer.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core;
   a cover disposed on the core; and
   a coating disposed on the cover, wherein the coating is formed from a two-part reactive composition comprising hydroxyurethane linkages and urethane linkages, wherein the two-part reactive composition comprises a first part comprising a first reaction product of at least one cyclic carbonate and at least one amine-terminated component and a second part comprising an isocyanate-containing component, and
   wherein the ratio of hydroxyurethane linkages to urethane linkages is 50:1 to 2:1.

2. The golf ball of claim 1, wherein the ratio of hydroxyurethane linkages to urethane linkages is 50:1 to 10:1.

3. The golf ball of claim 1, wherein the amine-terminated component comprises a solvent.

4. The golf ball of claim 1, wherein the cyclic carbonate comprises a five-membered cyclic carbonate, a six-membered cyclic carbonate, or a combination thereof.

5. The golf ball of claim 1, wherein the amine-terminated component comprises two primary functional amines at terminal ends of a polyol backbone.

6. The golf ball of claim 5, wherein the polyol backbone comprises a polyether polyol backbone.

7. The golf ball of claim 1, wherein the amine-terminated component comprises three primary amine functional groups.

8. The golf ball of claim 1, wherein the cyclic carbonate has a cyclocarbonate functionality of equal to or greater than 2.

9. The golf ball of claim 1, wherein the isocyanate-containing component comprises a blocked isocyanate.

10. A golf ball, comprising:
    a core;
    a cover disposed on the core; and
    a coating disposed on the cover, wherein the coating is formed from a two-part reactive composition comprising hydroxyurethane linkages and urea linkages, wherein the two-part reactive composition comprises a first part comprising a first reaction product of at least one cyclic carbonate and at least one amine-terminated component and a second part comprising an isocyanate-containing component, and
    wherein the ratio of hydroxyurethane linkages to urea linkages is 50:1 to 2:1.

11. The golf ball of claim 10, wherein the ratio of hydroxyurethane linkages to urea linkages is 50:1 to 10:1.

12. The golf ball of claim 10, wherein the amine-terminated component comprises a solvent.

13. The golf ball of claim 10, wherein the cyclic carbonate comprises a five-membered cyclic carbonate, a six-membered cyclic carbonate, or a combination thereof.

14. The golf ball of claim 10, wherein the amine-terminated component comprises two primary functional amines.

15. The golf ball of claim 14, wherein the two primary functional amines are at terminal ends of a polyol backbone.

16. The golf ball of claim 15, wherein the polyol backbone comprises a polyether polyol backbone.

17. The golf ball of claim 10, wherein the cyclic carbonate has a cyclocarbonate functionality of equal to or greater than 2.

18. The golf ball of claim 10, wherein the isocyanate-containing component comprises a blocked isocyanate.

19. A golf ball, comprising:
a core;
a cover disposed on the core; and
a coating disposed on the cover, wherein the coating is formed from a two-part reactive composition comprising hydroxyurethane linkages and urethane and/or urea linkages,
wherein the two-part reactive composition comprises:
a first part comprising a first reaction product of at least one cyclic carbonate having cyclocarbonate functionality of equal to or greater than 2, and at least one amine-terminated component; and
a second part comprising an isocyanate-containing component, and
wherein the ratio of hydroxyurethane linkages to urethane and/or urea linkages is 50:1 to 2:1.

20. The golf ball of claim 19, wherein the ratio of hydroxyurethane linkages to urethane and/or urea linkages is 50:1 to 10:1.

* * * * *